United States Patent
Hoshihara et al.

(10) Patent No.: US 6,880,887 B2
(45) Date of Patent: Apr. 19, 2005

(54) SEAT RECLINING DEVICE

(75) Inventors: Naoaki Hoshihara, Obu (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/464,632

(22) Filed: Jun. 19, 2003

(65) Prior Publication Data

US 2004/0036337 A1 Feb. 26, 2004

(30) Foreign Application Priority Data

Jun. 19, 2002 (JP) ........................................ 2002-178764

(51) Int. Cl.⁷ .............................................. B60N 2/22
(52) U.S. Cl. ........................................................ 297/367
(58) Field of Search .............................. 297/367, 378.12

(56) References Cited

U.S. PATENT DOCUMENTS

| | | | | |
|---|---|---|---|---|
| 3,737,946 A | * | 6/1973 | Giuliani ....................... 297/367 |
| 4,082,352 A | * | 4/1978 | Bales et al. .................. 297/364 |
| 5,988,751 A | * | 11/1999 | Yoshida et al. .............. 297/367 |
| 6,039,400 A | * | 3/2000 | Yoshida et al. .............. 297/367 |
| 6,149,235 A | * | 11/2000 | Fahim ..................... 297/378.12 |
| 6,220,666 B1 | * | 4/2001 | Ohya ......................... 297/367 |
| 6,312,053 B1 | * | 11/2001 | Magyar ....................... 297/367 |
| 6,328,383 B1 | | 12/2001 | Rohee et al. |
| 6,474,740 B1 | * | 11/2002 | Kondo et al. ................ 297/367 |
| 6,561,585 B1 | * | 5/2003 | Cilliere et al. .............. 297/367 |
| 6,722,738 B1 | * | 4/2004 | Uramichi .................... 297/367 |

FOREIGN PATENT DOCUMENTS

JP 11-56513 A 3/1999

\* cited by examiner

*Primary Examiner*—Peter R. Brown
(74) *Attorney, Agent, or Firm*—Burns, Doane, Swecker & Mathis, L.L.P.

(57) ABSTRACT

A seat reclining device includes a lower arm, an upper arm, and a locking mechanism including a cam rotatable relative to either the lower arm or the upper arm and restricting a relative rotation between the lower arm and the upper arm. The seat reclining device further includes a spring disposed in a space formed between the cam and either one of the lower arm or the upper arm for biasing the cam in a direction in which the locking mechanism restricts the relative rotation between the lower arm and the upper arm. The spring is wound around a rotational axis of the cam and disposed in an opening hole formed at either one of the lower arm or the upper arm. The spring includes an inner engaging portion to be engaged with the cam and an outer engaging portion to be engaged with the opening hole.

4 Claims, 3 Drawing Sheets

SEAT RECLINING DEVICE

This application is based on and claims priority under 35 U.S.C. § 119 with respect to Japanese Application No. 2002-178764 filed on Jun. 19, 2002, the entire content of which is incorporated herein by reference.

FIELD OF THE INVENTION

This invention generally relates to a seat reclining device for adjusting an angle of incline of a seat back relative to a seat cushion. More particularly, the present invention pertains to an installation structure of a spring provided in a locking mechanism of the seat reclining device.

BACKGROUND OF THE INVENTION

A known spring installation structure in a seat reclining device is disclosed in Japanese Patent Laid-Open Publication No. 11-056513. The disclosed seat reclining deice includes a lower arm fixed to a seat cushion, an upper arm fixed to a seat back and rotatably engaging with the lower arm, and a locking mechanism restricting the rotation of the upper arm and the lower arm. A spring for normally biasing the locking mechanism in a direction in which the rotation of the lower arm and the upper arm is restricted is disposed in a hole formed at a center portion of the lower arm. One end of the spring engages with an outer surface while the other end of the spring engages with a cam of the locking mechanism.

Further, another known spring installation structure is disclosed in U.S. Pat. No. 6,328,383. The disclosed device has a similar structure to the disclosed device in Japanese Patent Laid-Open Publication No. 11-056513. The spring biasing the locking mechanism in the direction in which the rotation of the lower arm and the upper arm is restricted is disposed in a detent formed at the center portion of the lower arm. One end of the spring engages with an inner portion of the detent while the other end engages with a rotating shaft to which an operating lever is connected.

According to the above-mentioned structures, the spring is disposed beyond a surface in the width direction of the lower arm, or an extending portion is formed in the width direction of the lower arm in order to obtain a space for accommodating therein the spring. Thus, a width of the seat reclining device becomes larger. It is desirable to obtain a space in the width direction of the seat as large as possible for providing a comfortable seating space for a passenger in a limited space of the vehicle. However, according to the above-mentioned devices, a passenger may feel uncomfortable when sitting in the seat equipped with such the reclining devices each having a large width.

Thus, a need exists for a seat reclining device having a small dimension in a width direction.

SUMMARY OF THE INVENTION

According to an aspect of the present invention, a seat reclining device includes a lower arm fixed to a cushion of the seat, an upper arm rotatably engaging with the lower arm, and a locking mechanism disposed between the lower arm and the upper arm and including a cam rotatable relative to either the lower arm or the upper arm and restricting a relative rotation between the lower arm and the upper arm by a rotation of the cam. The seat reclining device further includes a spring disposed in a space formed between the cam and either one of the lower arm or the upper arm for biasing the cam in a direction in which the locking mechanism restricts the relative rotation between the lower arm and the upper arm. The spring is wound around a rotational axis of the cam and disposed in an opening hole formed at either one of the lower arm or the upper arm. The spring includes an inner engaging portion to be engaged with the cam and an outer engaging portion to be engaged with the opening hole.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

An embodiment of the present invention is explained referring to attached drawings.

Figure 1:
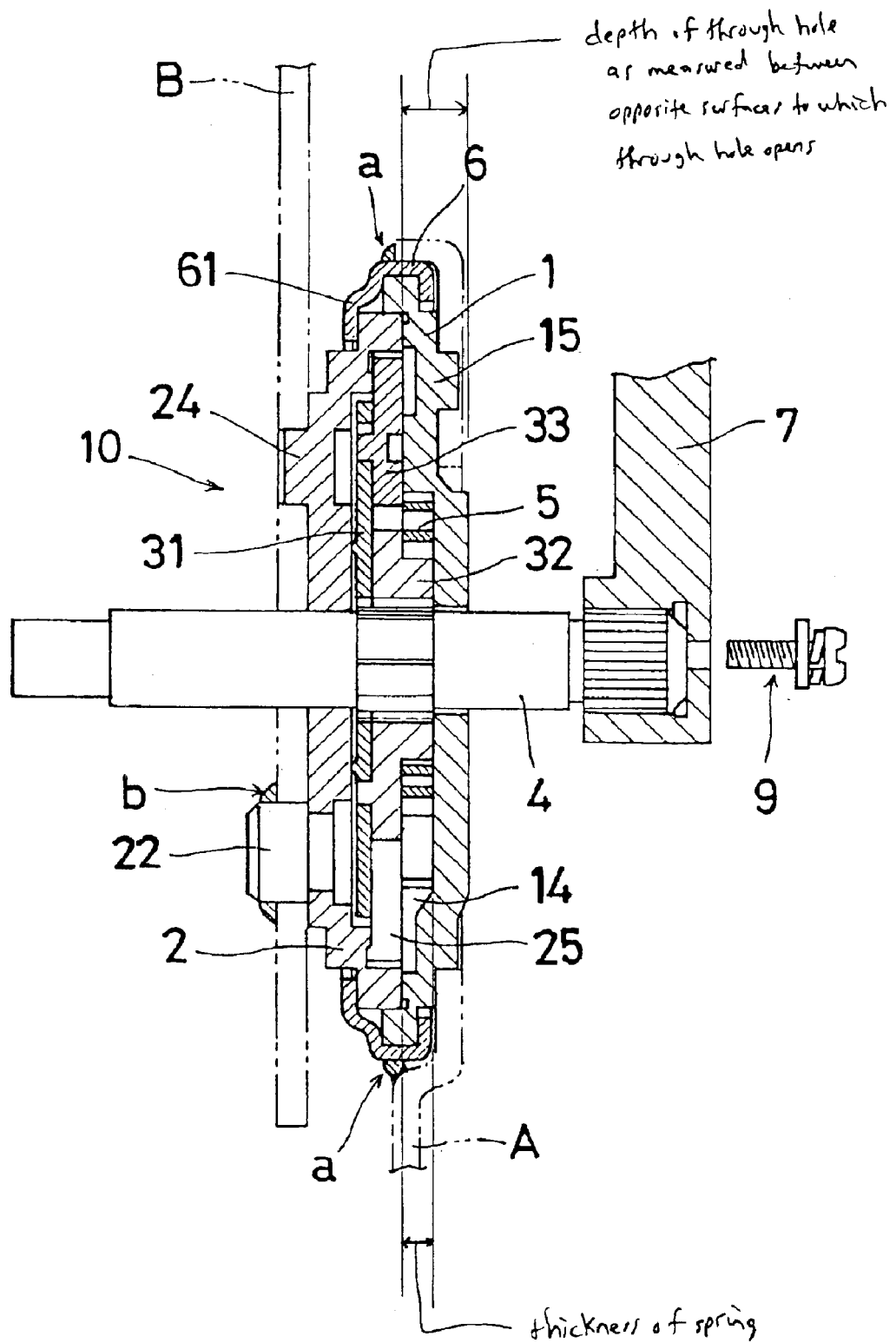
FIG. 1 is a cross-sectional view of a seat reclining device according to an embodiment of the present invention.

As shown in FIG. 1, a seat reclining device 10 includes a lower arm 1 having a disk shape, and an upper arm 2 having also a disk shape and rotatably engaging with the lower arm 1. An angle of incline of a seat back (not shown) relative to a seat cushion (not shown) is adjustable by the rotation of the lower arm 1 and the upper arm 2. The seat reclining devices 10 are normally equipped on right and left sides respectively of the seat and operated together by being connected via a rotating shaft 4.

The lower arm 1 is fixed by welding on a seat cushion frame A as a strength member of the seat cushion via a plurality of embosses 15 formed on one surface of the lower arm 1, which is not facing to the upper arm 2, by projecting therefrom and a holder 6 arranged at an outer periphery of the lower arm 1. The upper arm 2 is fixed by welding on a seat back frame B as the strength member of the seat back via a plurality of embosses 24 formed on one surface of the upper arm 2, which is not facing to the lower arm 1, by projecting therefrom.

As shown in FIG. 1, a recessed portion 11 is formed on the lower arm 1 in a partial pressing manner, so-called half die cutting. Precisely, the recessed portion 11 is circular shaped by being bent in a thickness direction (i.e. width direction in FIG. 1) of the lower arm 1. The center (i.e. rotational center or center of radius) of the recessed portion 11 matches the center of the disk shape as a whole of the lower arm 1. The upper arm 2 is disposed inside the recessed portion 11 so that an outer circumference 21 of the upper arm 2 is slidably engaged with an inner circumference 11a of the recessed portion 11. The lower arm 1 and the upper arm 2 are relatively rotated to each other since the slide engagement between the inner circumference 11a of the lower arm 1 and the outer circumference 21 of the upper arm 2 functions as the bearing engagement. Further, the engagement between the lower arm 1 and the upper arm 2 is retained by an inner peripheral surface of the holder 6 having an annular shape and an outer peripheral surface of the upper arm 2 in contact with each other so as to press each other.

Figure 2:
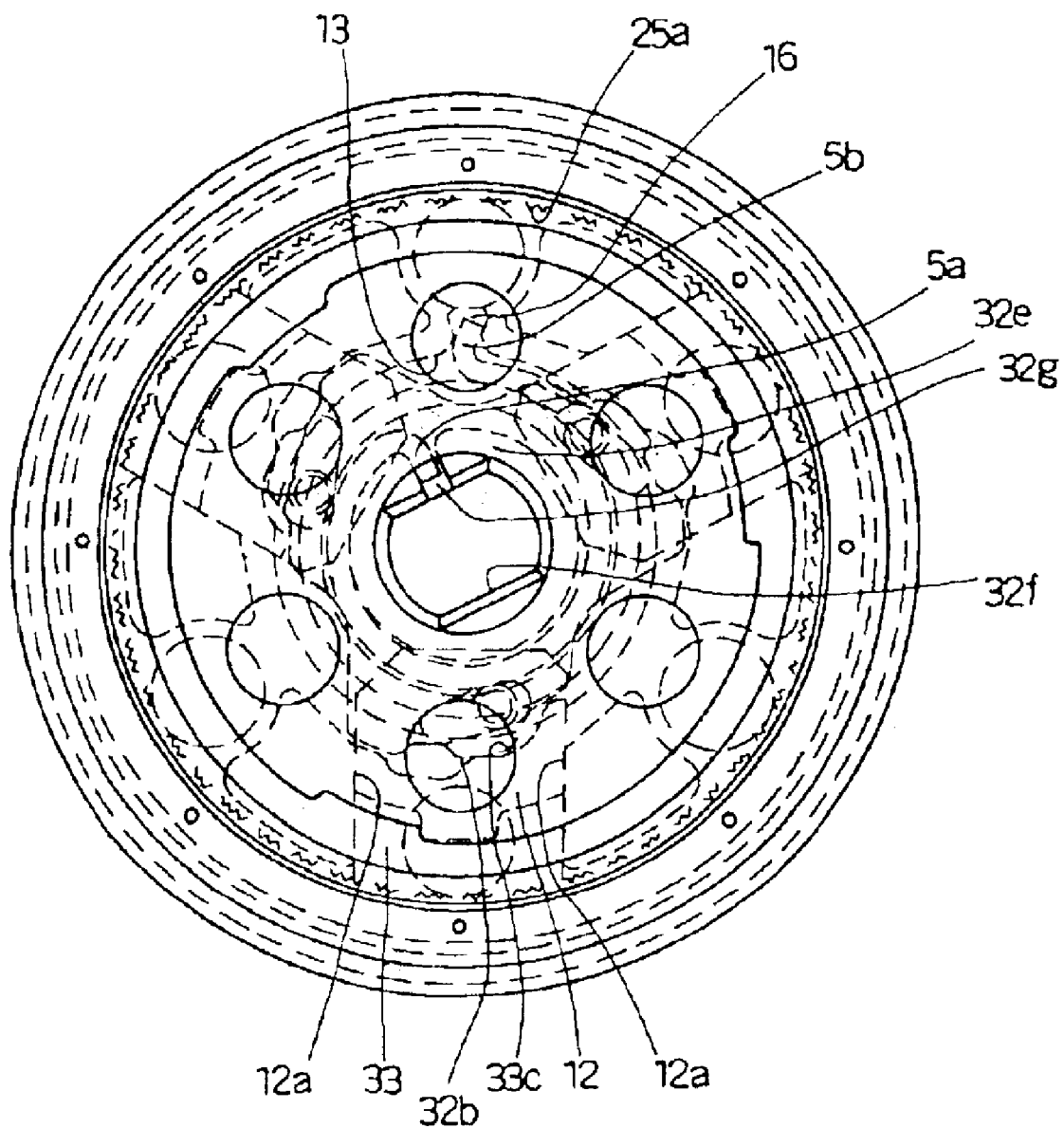
FIG. 2 is a plane view of the seat reclining device according to the embodiment of the present invention.

As shown in FIG. 1, a circular shaped first concave portion 25 is formed on the upper arm 2 in the half die cutting manner. The center (i.e., rotational center or center of radius) of the first concave portion 25 matches the center of the disk shape as a whole of the upper arm 2. The first concave portion 25 is dent and opens to the side facing the lower arm 1. An inner circumference of the first concave portion 25 is formed with an inner gear portion 25a as shown in FIG. 2. Further, a second concave portion 26 is formed at an inner side of the first concave portion 25. The center (i.e., rotational center or center of radius) of the second concave portion 26 matches that of the first concave portion 25.

Figure 3:
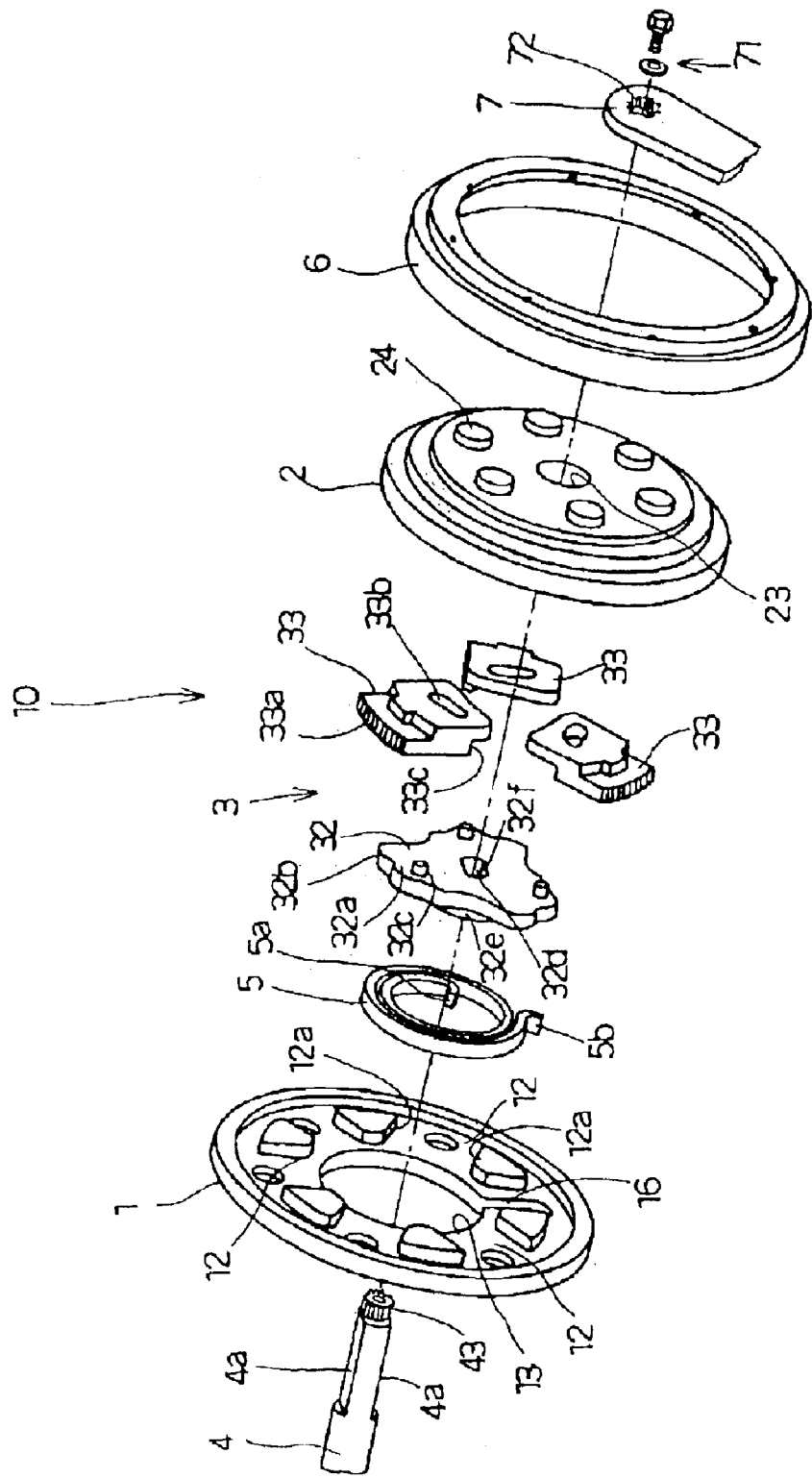
FIG. 3 is an exploded perspective view of the seat reclining device according to the embodiment of the present invention.

As shown in FIG. 3, a locking mechanism 3 is disposed between the lower arm 1 and the upper arm 2. Precisely, the locking mechanism 3 is arranged in a space defined between the first concave portion 25 and the second concave portion 26. The locking mechanism 3 includes three pawls 33 and a cam 32 as shown in FIGS. 2 and 3. The three pawls 33 are each substantially rectangular board shaped and arranged on a facing surface of the lower arm 1 to the upper arm 2 at equal angular intervals. Each pawl 33 is slidably engaged with a respective guide groove 12 via both end faces in the width direction of each pawl 33. Each guide groove 12 includes a pair of facing wall portions 12a in parallel with each other and extends in a radial direction from the center of the lower arm 1. Each pawl 33 includes an outer gear portion 33a at an outer periphery thereof that engages with the inner gear portion 25a of the upper arm 2. A cam hole 33b is formed at each pawl 33 by completely extending in a thickness direction thereof. Further, a stepped portion is formed at a middle portion between each cam hole 33b and each outer gear portions 33a of each pawl 33. In addition, each pawl cam surface 33c is formed on an opposite side to each outer gear portion 33a of each pawl 33. The pawl cam surface 33c is formed so as to incline relative to a pitch circle of the outer gear portion 33a.

The cam 32 is formed with three cam portions 32a arranged in an equally spaced manner and radially outwardly extending from the center of the cam 32. Each tip portion of the respective cam portion 32a is formed with a cam surface 32b. Each pawl cam surface 33c is formed to incline relative to a rotation path of the respective cam surface 32b when the cam 32 is rotated in a counterclockwise direction in FIG. 2. Thus, the cam surface 32b presses the pawl 33 in a direction in which the outer gear portion 33a of the pawl 33 and the inner gear portion 25a of the upper arm 2 become engaged with each other due to the contact between the cam surface 32b and the pawl cam surface 33c. In addition, each projection 32c is formed at a facing surface of the respective cam portion 32a to the pawls 33 and inserted into the respective cam hole 33b.

The rotating shaft 4 extends horizontally in the width direction of the seat along a rotation axis of the seat reclining device 10. The rotating shaft 4 is provided to connect the seat reclining devices 10 with each other arranged on right and left sides of the seat. Two surfaces 4a are formed at the outer periphery of the rotating shaft 4, facing to each other. The rotating shaft 4 passes through a hole 13 formed at a center of the lower arm 1, a hole 32d formed at a center of the cam 32, and a hole 23 formed at a center of the upper arm 2.

Two surfaces 32f formed at an inner circumference of the hole 32d are engaged with the two surfaces 4a of the rotating shaft 4 for transmitting the rotation force of the rotating shaft 4 to the cam 32. A gap is formed between the rotating shaft 4 and the hole 32d when the two surfaces 4a of the rotating shaft 4 and the two surfaces 32f of the hole 32d are engaged with each other so that a small relative rotation is permitted between the cam 32 and the rotating shaft 4. According to this small relative rotation to be permitted, the locking mechanisms 3 provided at right and left sides respectively of the seat can surely perform the locking operation without being affected by the position deviation caused between the seat reclining devices 10 on right and left sides due to a dimension deviation of the seat and the like.

The rotating shaft 4 passes through the seat reclining device 10. An end portion of the rotating shaft 4 protrudes outside from the hole 23 of the upper arm 2. In addition, a serration 43 is formed at the end portion of the rotating shaft 4. An operation handle 7 is provided with a serration 72 for engaging with the serration 43 of the rotating shaft 4. The operation handle 7 is then fixed to the rotating shaft 4 by a screw device 71. The operation handle 7 may be provided at both ends of the rotating shaft 4 so that the seat reclining is adjustable at either side of the seat.

As shown in FIG. 2, a recessed portion 16 is formed at an inner circumference of the hole 13 of the lower arm 1 and extends radially outwardly from the inner circumference of the hole 13. In addition, a boss portion 32e is formed around the hole 32d of the cam 32 and extends into the hole 13 of the lower arm 1. The boss portion 32e is formed with a groove 32g opening to the outer surface of the boss portion 32e and extending in a radially inwardly direction of the boss portion 32e as shown in FIG. 2.

A spiral spring 5 is formed by winding wire rods having a plane shape. An outer engaging portion 5b of the spiral spring 5 is positioned in the recessed portion 16 and engaged therewith. An inner engaging portion 5a is also positioned in the groove 32g and engaged therewith. According to this structure, the cam 32 is rotated in a counterclockwise direction in FIG. 2 by a biasing force of the spiral spring 5.

In an assembling process of the seat reclining device 10, the locking mechanism 3 is first installed between the upper arm 2 and the lower arm 1. Then, the holder 6 is assembled to the outer circumference of the upper arm 2 and the lower arm 1 by a caulking process. According to this embodiment, the spiral spring 5 can be easily assembled to the seat reclining device 10 without using special equipment for assembly after the locking mechanism 3, the lower arm 1, and the upper arm 2 are assembled compared to a case in which the spring is already mounted in the device and thus cannot be assembled after the locking mechanism 3, the lower arm 1, and the upper arm 2 are assembled. In addition, a manufacturing cost of the device of the present invention can be decreased.

The lower arm 1 is fixed by welding on the seat cushion frame A when the seat reclining device 10 is installed in the seat as mentioned above. As shown in FIG. 1, the hole 13 of the lower arm 1 is covered with the seat cushion frame A after welding. According to this structure, the spiral spring 5 can be surely supported and also dust and the like are prevented from entering into the locking mechanism 3 through the hole 13.

An operation of the seat reclining device 10 having the above-mentioned structure is explained as follows.

According to the present embodiment of the seat reclining device 10, the cam 32 is constantly rotated in the counterclockwise direction in FIG. 2 by the biasing force of the spiral spring 5. The cam 32 is then in contact with the pawl cam surface 33c, thereby engaging the outer gear portions 33a of the pawls 33 and the inner gear portion 25a of the upper arm 2 with each other. As a result, the rotation of the upper arm 2 relative to the lower arm 1 is restricted.

When the operation handle 7 is operated under the above-mentioned condition, the rotating shaft 4 is rotated as a unit with the cam 32 in the clockwise direction in FIG. 2 against the biasing force of the spiral spring 5. At this time, each projection 32c formed at each cam portion 32a is in contact with the inner surface of the respective cam hole 33b, thereby pulling the three pawls 33 at the same time to a rotational center direction of the seat reclining device 10. The engagement between the outer gear portions 33a and the inner gear portion 25 is thus released. The seat back can be reclined to a required position relative to the seat cushion.

When the operation handle 7 is released, the rotating shaft 4 is then rotated in the counterclockwise direction by the biasing force of the spiral spring 5. The cam 32 is then in contact with the pawl cam surfaces 33c again, thereby pushing all of the pawls 33 radially outwardly. As a result, the outer gear portions 33a of all of the pawls 33 and the inner gear portion 25a of the upper arm 2 are engaged with each other, thereby restricting the rotation of the upper arm 2 relative to the lower arm 1. At this time, each spiral spring 5 of the seat reclining devices 10 on right and left sides respectively of the seat biases the respective cam 32. In addition, the small relative rotation between the cam 32 and the rotating shaft 4 is permitted as mentioned above. The cams 32 arranged on right and left sides respectively of the seat are not affected by each other and thus the respective seat reclining device 10 can be surely locked to operate.

According to the present embodiment, the spiral spring 5 is accommodated within the hole formed at the center portion of the lower arm 1 and does not extend from the outer surface of the lower arm 1 in the width direction thereof. In addition, the lower arm 1 is not formed in a protruding shape and thus the width direction of the seat reclining device 10 in FIG. 1 can be configured to be thinner.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A seat reclining device comprising:

a lower arm fixed to a cushion of the seat;

an upper arm rotatably engaging with the lower arm;

a locking mechanism disposed between the lower arm and the upper arm and including a cam rotatable relative to either the lower arm or the upper arm and restricting a relative rotation between the lower arm and the upper arm by a rotation of the cam; and a spring disposed between the cam and one of the lower arm and the upper arm for biasing the cam in a direction in which the locking mechanism restricts the relative rotation between the lower arm and the upper arm, the spring wound around a rotational axis of the cam and disposed in a through hole formed on said one of the lower arm and the upper arm, the spring including an inner engaging portion to be engaged with the cam and an outer engaging portion to be engaged with the through hole, the through hole opening to opposite surfaces of said one of the lower arm and the upper arm;

said spring possessing a thickness that is the same as a depth of the through hole as measured between said opposite surfaces.

2. A seat reclining device according to claim 1, wherein the cam includes a hole formed at a center portion of the cam, a boss portion formed around the hole, and a groove opening to an outer surface of the boss portion and extending in a radially inwardly direction of the boss portion.

3. A seat reclining device according to claim 2, wherein the opening hole includes a recessed portion at an inner circumference thereof which extends radially outwardly from the inner circumference of the opening hole.

4. A seat reclining device according to claim 3, wherein the inner engaging portion is positioned in the groove of the cam and engaged therewith while the outer engaging portion is positioned in the recessed portion of the opening hole and engaged therewith.

* * * * *